3,520,949
HYDROPHILIC POLYMERS, ARTICLES AND METHODS OF MAKING SAME

Thomas H. Shepherd and Francis E. Gould, Princeton, N.J., assignors to National Patent Development Corporation, New York, N.Y., a corporation of Delaware
No Drawing. Filed July 26, 1966, Ser. No. 567,856
Int. Cl. C08f *15/16, 47/10;* C08g *41/04*
U.S. Cl. 260—857                           2 Claims

ABSTRACT OF THE DISCLOSURE

The invention relates to the preparation of a hydrophilic cross-linked polymer which comprises admixing a water soluble polymerizable hydroxyalkyl monoester of a mono-olefinic monocarboxylic acid and a polymerizable diester of a mono-olefinic monocarboxylic acid in the presence of a linear polyamide.

---

This invention relates to novel hydrophilic polymers and processes of making same and has particular relation to such hydrophilic polymers in the form of casting syrups, friable solid foams and in powdered form, the latter form being particularly adapted as a carrier for medicinally-active substances and for natural and synthetic flavors, essences, fragrances, spices, food colors, sweeteners, dyes and the like.

It is known to produce hydrophilic polymers, particularly to produce cross-linked hydrophilic polymers and, more particularly, to produce same in the form of shaped body hydrogels in an aqueous solution by copolymerization whereby a major portion of a monoester of acrylic or methacrylic acid with a bi-functional alcohol which has an esterifiable hydroxyl group and at least one additional hydrophilic functional group is copolymerized in aqueous solution with a small amount of a diester of these acids and of an alcohol which has at least two esterifiable hydroxyl groups (see U.S. Pat. Nos. 2,976,576 and 3,220,960).

It is known that said prior art shaped body, hydrophilic polymers prepared in an aqueous system are carriers for medicinally-active substances. Thus, it is known that medicinally-active substances may be dissolved in the aqueous constituent of such prior art shaped body hydrogels to provide gradual release of the medicinally-active substances; however, the resulting solutions are difficult to handle and store and the medicinal components are susceptible to air oxidation, degradation, deterioration, evaporation, etc.

Heretofore, it has been necessary to prepare a solid or shaped body of the hydrophilic polymer and thereafter dissolve in the aqueous constituents of such shaped body the medicinal flavor, sweeteners, coloring agent and the like. Additionally, in the prior art preparation, employing copolymerization in an aqueous solution, it has not been possible to directly prepare a foam by the addition of the usual foaming agents, such as sodium bicarbonate, for the reason that a soft semi-gelatinous hydrogel product resulted rather than the desired hard friable foam and it was not possible to convert such semi-gelatinous product to a friable foam or to a compactable powder.

In addition, the said prior art process employing the conventional redox catalyst such as sodium bicarbonate and ammonium persulfate, potassium sulfate, sodium thiosulfate and ammonium persulfate or potassium sulfate, caused the polymerization reaction to go to completion at temperatures above 0° C. thereby preventing the preparation of a prepolymer preferably in the form of a liquid casting syrup which is capable of being dyed, pigmented, thickened and otherwise varied in form and thereafter cured to form solid or shaped bodies such as rods, sheets, tubes and other molded articles; or a hard, friable foam as will be hereinafter further described.

It now has been found that hydrophilic polymers can be prepared in a water-free system so as to permit the direct preparation of liquid casting syrups in prepolymer form which can be used for direct in situ polymerization in the form of castings of shaped bodies, films and coatings, which can be treated with conventional foaming agents such as sodium bicarbonate to result in hard, friable foams which can be directly formed into the swelled state or ground directly to powder form.

It also has been found that hydrophilic polymers can be prepared in a water-free system so as to permit ready preparation of the hydrophilic polymer products in powdered form. An object of the present invention is to prepare said hydrophilic polymers in a water-free system to permit their direct conversion to a powdered foam whereby the powdered polymers are especially adapted as carriers for medicinally-active substances, natural or synthetic flavors, essences, fragrances, spices and the like. The polymeric powders of the present invention have been found to be compact in form and have been found to provide the necessary stability and shelf life to enable their use as carriers for medicinal and flavoring substances which are susceptible to chemical reactions such as air oxidation, deterioration, evaporation and degradation.

A further advantage derived from the compactness ability of the instant powdered hydrophilic polymers is that upon encapsulation of the said powder carrying medicinally-active substances, flavors, essences and the like, greater stability and longer shelf life are provided than was heretofore possible.

Polymeric powders containing encapsulated flavors, essences or spices can be reconstituted in solution at will, thus providing superior flavoring solutions because encapsulation prevents air deterioration of the flavoring component and also prevents losses due to evaporation.

The liquid casting syrups of this invention are prepared by mixing a major amount of suitably purified commercial polymerizable monoester of an olefinic acid containing at least one substituted hydrophilic functional group with a minor concentration of a free-radical catalyst and heating from ambient temperature to 80° C. until the monomer no longer shows water solubility. This product is then cooled to room temperature and addition of theoretical catalyst content carried out. The casting syrup can then be suitably dyed and pigmented and the fluid viscosity inrceased as desired by addition of appropriate thickening agents.

The casting syrup can then be cured to form products capable of being cast, formed or machined into rods, sheets, etc., for various uses. The product can exist in a rigid state, swelled state or as a foam. The polymer obtained from the cured casting liquids has good mechanical strength, reversible fluid absorption properties, the ability to retain its shape in a fluid media and to elastically recover it after deformation.

The casting syrup is also suitable, for example, for in situ polymerization in dental prosthesis, particularly for use in the preparation of denture liners and mouth guards. The absorbent qualities of the cured product permit advantageous use in other medical-surgical applications such as heart valves, vessel substitutes, dializer diaphragms, intra-uterine devices and the like.

The hydrophilic polymers of the present invention, polymerized in the water-free state, can be formed to adhere to metal, glass, rubber, plastics and other surfaces. Also, they can be cast into solid bodies which can be formed and ground into toric contact lens, which heretofore has not been possible with hydrophilic polymers polymerized in aqueous solution.

Starting materials which may be utilized in accordance with the present invention are hydroxy alkyl esters of an alpha-beta unsaturated carboxylic acid such as 2-hydroxy ethyl methacrylate, hydroxy propyl methacrylate and the like. These are admixed in a water-free system with appropriate quantities of a free radical catalyst such as tertiary butyl peroctoate, isopropyl percarbonate, benzoyl peroxide, and the like and a suitable cross-linking monomer such as ethylene glycol dimethacrylate, 1,3-butylene dimethacrylate, 1,4-butylene dimethacrylate or other polyfunctional monomeric esters.

Free radical catalyst concentrations in the range of 0.05 g. to 0.3 g. catalyst per 100 g. of polymerizable hydroxy alkyl ester have been found to be adequate with the preferred quantity being between 0.1 and 0.2 g. per 100 g. starting material.

The mechanical properties imparted to the polymer of the invention and its ability to retain water as a homogeneous constituent are strongly influenced by the proportion of polyfunctional cross-linking agent present. For the polymer of this invention, concentrations of 0.05 to 10 g./100 g. of 2-hydroxy ethyl methacrylate have been found convenient, the preferred range being 0.1 to 0.2 g. crosslinking agent per 100 g. of polymerizable hydroxy alkyl ester.

Polymerization of the above reactants may be accelerated by the application of heat or, by selecting the catalyst and the amount thereof, the application of heat may be omitted and rapid polymerization induced at ambient temperatures. In instances where heat is applied for curing, temperatures ranging from about 20° C. to about 80° C. have been found to be convenient with 40 to 70° C. being the preferred range.

Another object of the present invention is to produce new properties, as set forth above, and to improve and upgrade existing properties of the base hydrophilic polymer material by the incorporation therewith of a minor amount of one or more additive components selected from the group consisting of resins, rosin esters, phenoxy resins, silicone resins, low molecular weight polyisobutylenes, synthetic polymers and prolamines. The new compositions are especially adapted to form polyblends, which produce new properties and improve and upgrade existing properties of the base hydrophilic polymer.

The mixture is heated or otherwise cured in the absence of compatible volatile or non-volatile organic solvents to produce thermosetting polymeric materials having properties superior to those of the major constituent of the formulation. The upgraded properties of these new compositions of matter include, but are not necessarily limited to, improved hardness, adhesion, abrasion, resistance, resiliency, and toughness. The polymerized material will yield products with improved machining and polishing characteristics and may also find use as a molding powder or polyblended with other molding compounds. Other slight property improvements can be effected through use of small amounts of other cross-linking glycol dimethacrylates.

The method of this invention may be used to produce thermosetting surface coatings with improved adhesion to various substrates or to produce thermosetting resins for use as sheetings and films with improved clarity and toughness.

In general, 2-hydroxy ethyl methacrylate and the crosslinking monomer ethylene glycol dimethacrylate in quantities ranging from 10 to 50% by weight (preferred range of 50%) is mixed with 90–50% by weight of a commercially available resin of the coumarone indene type or their phenol modified counterparts in the presence of a free radical catalyst such as tertiary butyl peroctoate, isopropyl percarbonate, etc., and heated at temperatures ranging from 40 to 200° C. for approximately 30 minutes. Organic or inorganic solvents are used as necessary to increase compatability of the components. Compatible polymers having improved properties of tensile strength, modulus, hardness, thermal conductivity, etc., are formed. The foregoing preferred proportional limitations also are employed with the phenoxy resin and the silicone resin additive components.

The resulting polymers can be prepared in the form of films or rods suitable for grinding into fine powders. By admixing foaming agents such as sodium bicarbonate with the reactants prior to curing, the polymer may be obtained in the form of a foam which is easily disintegrated into a fine powder by means of a shearing action. The polymeric powders of this invention are preferably obtained from foams. Quantities of 1 to 4 grams foaming agent per 100 grams of reactants have been found to be sufficient.

Polymeric powders prepared by any of the above means are mixed with natural or synthetic flavors or essences dissolved in an appropriate solvent and the mixture placed on a mechanical roller so that the solution becomes intimately mixed. The solution is then filtered and dried by air evaporation or forced heat. Upon evaporation of the solvent the flavoring or essence is retained by the powder. Due to its extreme hydrophilicity and because the hydrophilic polymer of this invention has reversible fluid adsorption properties, the powders can be reconstituted in solution at will to provide solutions which give concentrated flavors or essences.

Vessel substitutes for humans made from plastics are well known in themselves but when made from the polymers of the invention possess new and useful properties. In addition to the required properties such as chemical, physical and thermal inertness, vessel substitutes made from the polymers of the invention possess unusual colloidal properties which permit them to be very closely assimilated to those of living tissue and hence suitable for contact with body tissues for prolonged periods of time. Articles made from the polymers of the invention can be sterilized by boiling and, by steeping them in a physiological solution prior to insertion as a body tissue replacement, can be made isotonic with the surrounding tissue.

An unexpected advantage of articles made from the polymers of the invention is that because of their reversible fluid adsorption properties, Heparin, dissolved in isotonic salt solution, or other anticoagulants in a suitable solvent, can be added during manufacture and polymerization in situ can then be effected. The anticoagulant is then present in the vessel substitute for slow release after transplant to prevent thrombic formation. Medicinally active substances, such as antibiotics and other active substances such as bacteriocides, antivirals, fungicides, which are water or alcohol soluble, may be added prior to polymerization or the end product polymer may be immersed in a solution of such substances to form a carrier.

The mechanical properties imparted to the polymer of the invention and its ability to achieve isotonicity with the surrounding tissue are strongly influenced by the proportion of polyfunctional cross-linking agent present. For the polymers of this invention, concentrations of 0.05 to 10 g./100 g. of 2-hydroxy ethyl or hydroxypropyl methacrylate have been found to be convenient, the preferred range being 0.1 to 1.0 g. cross-linking agent per 100 g. of polymerizable hydroxy alkyl ester.

Prior to casting, the vessel substitutes may be reinforced with strengthening materials such as woven glass fibers, Dacron and the like, in various mil and denier sizes present in tubular form in the mold so that the strengthening material is completely encased by the casting solution.

Polymerization of the casting solutions may be accelerated by the application of heat or, by selecting the catalyst and the amount thereof, the application of heat may be omitted and rapid polymerization induced at ambient temperatures. In instances where heat is applied for curing, temperatures ranging from about 20° C. to about 80° C. have been found to be convenient with 40 to 50° C. being the preferred range.

Additionally, the polymers of the present invention are particularly adapted for the manufacture of other prosthetic devices such as body implants inasmuch as the liquid casting syrups in prepolymer form can be used for direct in situ polymerization. Contraceptive devices, such as intra-uterine implants, diaphragms, and the like are well known in the art. A difficulty commonly encountered in the fabrication of such devices is that the material from which they are made is frequently irritating to such body tissues as mucous membranes. In addition, these devices frequently undergo deterioration on repeated sterilization by boiling water or steam. The difficulties encountered in the prior art may be eliminated by fabrication of contraceptive devices comprised of the polymers of the present invention. In addition to the required properties such as chemical, physical and thermal inertness, the contraceptive devices made from the polymers of this invention possess unusual colloidal properties which permit them to be closely assimulated to living tissue. This permits them to be suitable for contact for prolonged periods of time. In order to obtain a device a suitable rigidity in such instances where this property is desired, it is preferable to blend in a filler material with the casting resin prior to final cure. The filler material may be an inert salt, such as barium sulfate, calcium carbonate, clay and the like. Another means of constructing a tissue compatible contraceptive device is by coating such a device made from another rigid plastic with the polymer composition of the present invention. Such a rigid device may be constructed of nylon, polyethylene, and the like. The poly-hydroxyalkyl ester functions to make the device more compatible with the tissue.

A further use of the present hydrophilic polymers in particulate form such as powders, beads, extrusions and the like, is as a filter medium for tobacco smoke and other gaseous combustion products. The present hydrophilic polymer provides a non-migratory humectant carrier when it is presaturated in a polyhydric alcohol, e.g., glycerine propylene glycol, polypropylene glycol and ethylene glycol. Additionally, the hydrophilic polymers of the present invention provide an excellent industrial filter medium in that they have the ability to retain and release other components, such as thiourea or dithioaerythritol, which are stable against oxidation and are therefore available for reaction with the toxic, irritant or odorous combustion products of the exhaust smoke to eliminate or modify same to non-objectionable form. Such components need only be soluble in the polyhydric alcohol, alcohol or water which is carried by the hydrophilic filtering medium. Thus, adsorption of and reaction with nitrous oxides, hydrocarbons and other combustion products in the gas stream can be had.

The hydrophilic filtering medium additionally can be compounded with tobacco flavoring material to fortify or supplement the flavor lost in the train of exhaust tobacco smoke on inhalation through the present filter medium which is capable of removing some of the tars and nitrogenous combustion products which are understood to contribute the desired tobacco flavor. Additionally, specific flavoring materials such as menthol and the like also can be incorporated into the filter material for release into the smoke train so as to improve the taste of the tobacco smoke upon inhalation.

The hydrophilic filter medium of the present invention can be readily employed for use as a chromatographic filter by means of its ability to absorb water soluble pigmented stain or color components.

The present hydrophilic polymers may be prepared in fiber form, preferably from a prepolymer liquid casting syrup adapted to be extruded into a polymerized water bath to form a solid continuous fiber which is air dried and oriented. The method comprises admixing in the solvent-free state a major amount of the monoester with a major amount of a synthetic resin, preferably a linear polyamide, in solution form with a solvent such as trifluoroethanol, and heating to form a prepolymer solution, cooling to room temperature and adding a minor amount of the diester in the presence of a minor amount of the free-radical catalyst sufficient to polymerize the prepolymer to the form of a viscous syrup, passing the syrup through an extruder into a heated fluid medium maintained to polymerize same into solid fiber form, removing the fiber from the liquid medium and air-drying and orienting same. The catalyst concentration preferably ranges from about 0.05–0.03 part per 100 parts of the monoester and preferably from about 0.1 to 0.2 part. The amount of catalyst employed ranges from about 0.05 to 10 parts per hundred parts of the monoester and preferably ranges from about 0.1 to about 0.5 part. The ratio of the monoester to the synthetic resin is from about 1:10 to 10:1, preferably from about 2:1 to equal parts by weight. Thus with nylon-6 the concentration of trifluoroethanol solution ranges from about 5 to 40% by weight, preferably 10–20%. Fiber extrusion temperatures range from about 20–40° C. with polymerizing water bath temperatures for quenching the extruded fiber ranging from about 50–100° C., 70–95° C. being preferred.

In another embodiment of the invention the present hydrophilic polymers in powdered form also may be employed as a thickening agent in foods, particularly in view of their ability to take up water when in the dry state.

In still another embodiment of the invention, the hydrophilic gel materials of the present invention may be employed in the form of a covering or bandage carrying medication which can be slowly released from the hydrophilic gel material. Preferably, the bandage is formed of a plastic mesh reinforcement member carrying the hydrophilic gel material in the form of a strip or layer which has been cast thereon.

In still another form of the invention, the hydrophilic gel material is adapted to carry water-soluble nutrients which can be released under controlled conditions. Thus, agar plates can be formed to carry the water soluble nutrient, then dried and available for substantially instant use upon soaking in water.

These and other objects and embodiments of the invention will be readily understood by reference to the following examples which are given by way of illustration without limitation:

EXAMPLE 1

Purified 2-hydroxy ethyl methacrylate is stirred with a cross-linking monomer, ethylene glycol dimethacrylate, in the concentration of 0.15 gram per 100 grams 2-hydroxy ethyl methacrylate. To the mixture is added 90 percent by weight of styrene copolymer resin (a commercial brand resin "Piccoflex" was employed) and 0.15 gram of a free-radical, vinyl polymerization catalyst, isopropyl percarbonate, in an anaerobic atmosphere at ambient temperature. The solution is cast into a mold to form a shaped diaphragm which is cured for thirty minutes at 200° C. for approximately 30 minutes and removed from the mold.

The diaphragm is machined and polished to form a finished article.

EXAMPLE 2

Purified 2-hydroxy ethyl methacrylate is stirred with ethylene glycol dimethacrylate, in the concentration of 0.1 gram per 100 grams 2-hydroxy ethyl methacrylate. To the mixture is added 50 percent by weight of coumarone-indene resin (a commercial brand resin "Cumar" was employed) and 0.15 gram isopropyl percarbonate is added in an anaerobic atmosphere at ambient temperature. The solution is cast onto a steel panel in the form of a film which is cured for 30 minutes at 40° C. to form a thermosetting film characterized by high gloss, adhesion, abrasion resistance, hardness and high impact strength.

EXAMPLE 3

Purified 2-hydroxy ethyl methacrylate is stirred with ethylene glycol dimethyacrylate, in the concentration of 0.1 gram per 100 grams 2-hydroxy ethyl methacrylate. To the mixture is added 75 percent by weight of polyvinyl acetate resin (a commercial brand resin "Polyco" was employed) and 0.15 gram benzoyl peroxide is added in an anaerobic atmosphere at ambient temperature. The solution is cast onto a steel panel to form a film which is cured for 30 minutes at 40° C. to form a thermosetting film characterized by high gloss, adhesion, abrasion resistance, hardness and high impact strength.

EXAMPLE 4

Purified 2-hydroxy ethyl methacrylate is stirred with ethylene glycol dimethacrylate, in the concentration of 0.05 gram per 100 grams 2-hydroxy ethyl methacrylate. To the mixture is added 50 percent by weight of terpene resin (a commercial brand resin "Piccolyte" was employed) and 0.05 gram isopropyl percarbonate is added in an anaerobic atmosphere at ambient temperature. The solution is cast onto a steel panel to form a film which is cured for 30 minutes at 40° C. to form a thermosetting film characterized by high gloss, adhesion, abrasion resistance, hardness and high impact strength.

EXAMPLE 5

Purified 2-hydroxy ethyl methacrylate is stirred with ethylene glycol dimethacrylate, in the concentration of 0.3 gram per 100 grams of 2-hydroxy ethyl methacrylate. To the mixture is added 50 percent by weight of phenolic resin (a commercial brand resin "Durez" was employed) and 0.3 gram isopropyl percarbonate is added in an anaerobic atmosphere at ambient temperature. The solution is cast onto a steel panel to form a film which is cured for 30 minutes at 40° C. to form a thermosetting film characterized by high gloss, adhesion, abrasion resistance, hardness and high impact strength.

EXAMPLE 6

Purified 2-hydroxy ethyl methacrylate is stirred with ethylene glycol dimethacrylate, in the concentration of 1.0 gram per 100 grams of 2-hydroxy ethyl methacrylate. To the mixture is added 50 percent by weight of pentaerythritol ester of a rosin derived resin (a commercial brand resin Pentalyn A was employed) and 0.2 gram isopropyl percarbonate is added in an anaerobic atmosphere at ambient temperature. The solution is cast onto a steel panel to form a thermosetting film which is cured for 30 minutes at 40° C. to form a film characterized by high gloss, adhesion, abrasion resistance, hardness and high impact strength.

EXAMPLE 7a

Purified 2-hydroxy ethyl methacrylate is stirred with ethylene glycol dimethacrylate, in the concentration of 0.1 gram per 100 grams 2-hydroxy ethyl methacrylate. To the mixture is added 50 percent by weight of glycol ester of a rosin resin (a commercial brand resin "Polypale Ester" was employed) and 0.15 gram isopropyl percarbonate is added in an anaerobic atmosphere at ambient temperature. The solution is cast onto a steel panel to form a film which is cured for 30 minutes at 40° C. to form a thermosetting film characterized by high gloss, adhesion, abrasion resistance, hardness and high impact strength.

EXAMPLE 7b

The foregoing proces is repeated with a methyl ester of a rosin resin (a commercial brand resin "Abalyn" being employed to replace the resin of the previous example) to result in thermosetting film.

EXAMPLE 7c

The foregoing process of Example 7a is repeated with a hydroabietyl alcohol (a commercial brand of a balsamic liquid "Abitol" being employed to replace the resin of Example 7a) to result in a thermosetting film.

EXAMPLE 7d

The foregoing process of Example 7a is repeated with polycaprolactam (a commercial brand "nylon-6" was employed to replace the resin of Example 7a) to result in a thermosetting film.

EXAMPLE 7e

The foregoing process of Example 7a is repeated with polysiloxane (a commercial brand resin "GE silicon Resin 84" being employed to replace the resin of Example 7a) to result in a shaped body in the form of a decorative article.

EXAMPLE 8a

Purified 2-hydroxy ethyl methacrylate is stirred with ethylene glycol dimethacrylate, in the concentration of 0.1 gram per 100 grams 2-hydroxy ethyl methacrylate. To the mixture is added 50 percent by weight of phenoxy resin characterized as a high molecular polyhydroxy ether resin prepared from bisphenol A and epichlorohydrin resin (a commercial brand resin "Phenoxy 8500" was employed) and 0.15 gram isopropyl percarbonate is added in an anaerobic atmosphere at ambient temperature. The solution is cast onto a steel panel to form a film which is cured for 30 minutes at 40° C. to form a thermosetting film characterized by high gloss, adhesion, abrasion resistance, hardness and high impact strength.

EXAMPLE 8b

The foregoing process is repeated with low molecular weight polyisobutylene in the range of 8700 to 10,000 M.W. (a commercial brand resin "Vistanex LM-MS" being employed to replace the polyhydroxy ether resin of the foregoing example) to form a thermosetting film characterized by high gloss, adhesion, abrasion resistance, hardness and high impact strength.

EXAMPLE 8c

The foregoing process of Example 8a is repeated with an alcohol soluble protein of corn consisting of globular prolamine having a molecular weight range of 40,000–50,000 (a commercial brand resin "Zein" being employed to replace the polyisobutylene of the foregoing Example 8a) to form a thermosetting film characterized by high gloss, adhesion, abrasion resistance, hardness and high impact strength.

EXAMPLE 9a 2-hydroxyl ethyl methacrylate (100 parts) is combined with t-butyl peroctoate (0.05 part) at 25° C. in an inert atmosphere. This mixture is combined with nylon-6 (100 parts) in trifluoroethanol (850 parts) to form a clear solution. This is heated at 65 to 70° C. to form a prepolymer. The prepolymer solution is cooled to 25° C. and t-butyl peroctoate (0.10 part) and ethylene glycol dimethacrylate (0.2 part) is added. The viscous syrup is passed through an extruder having an orifice of 0.01 in diameter. The extruded fiber is passed immediately into a heated water bath, maintained at a polymerizing temperature of 80° C. After 30 minutes the solid fiber is removed from the water, is air dried and oriented at 100° C.

Fabrics made from this fiber are extremely smooth in texture and have a high degree of softness to the touch.

EXAMPLE 9b

The procedure of Example 9 is repeated with the modification that isomeric hydroxy propyl methacrylate is employed in place of hydroxy ethyl methacrylate.

EXAMPLE 9c

The procedure of Example 9a is repeated with the modification that α-cumene hydroxy peroxide is employed as the free-radical vinyl polymerization catalyst.

EXAMPLE 10a 2-hydroxy ethyl methacrylate (50 parts) and $TiO_2$ (30 parts) are ground in a pebble mill to a fine powder (Hegeman 7–8). Additional 2-hydroxy ethyl methacrylate (50 parts) is added along with ethylene glycol dimethacrylate (0.2 part), cobalt naphthenate a conventional metallic paint dryer or catalyst (0.1 part) and t-butyl peroctoate (0.4 part). The resulting viscous syrup is painted onto a wooden boat hull and cured at 20 to 35° C. The resulting protective marine coating is characterized by its ability to discourage barnacle and algae growth and corrosion on prolonged underwater exposure.

EXAMPLE 10b

The procedure of Example 10a is repeated with the modification that the coating syrup is cast onto a steel hull and cured at 100° C. in the absence of cobalt naphthenate.

EXAMPLE 10c

The procedure of Example 10a is repeated employing an isomeric mixture of hydroxy isopropyl methacrylate isomers in place of the hydroxy ethyl methacrylate.

EXAMPLE 11a

A solution comprised of 2-hydroxy ethyl methacrylate (100 parts), ethylene glycol dimethacrylate (0.2 part), and t-butyl peroctoate (0.4 part) is cast onto a neoprene rubber sheet and heated at 70° C. for 1 hour. The resulting coated sheet is easily fabricated into a bathing cap form having the aforementioned properties.

EXAMPLE 11b

A solution comprised of 2-hydroxy ethyl methacrylate (100 parts), ethylene glycol dimethacrylate (0.2 part), and t-butyl peroctoate (0.4 part) is cast onto a neoprene rubber sheet, covered by a second rubber sheet so as to exclude air, and heated at 80° C. for 1 hour. At the end of this time, both sheets are firmly bonded to one another by the intermediate polymeric layer.

EXAMPLE 12a 2-hydroxy ethyl methacrylate (100 parts) is stirred with 0.05 part t-butyl peroctoate in a nitrogen atmosphere at a temperature of 40° C. for 30 minutes. The resultant mixture is cooled to 25° C. and t-butyl peroctoate added so as to make the total amount of t-butyl peroctoate added in the system 0.15 part. Eethylene glycol dimethacrylate (0.1 part) is added at the same time. The casting solution is poured into molds conforming to the desired shape of an intra-uterine device of the type shown in U.S. Pat. No. 3,200,815 and then cured at 70° C.

EXAMPLE 12b

The process of Example 12a is repeated, substituting 0.2 part of 1,3-butylene glycol dimethacrylate as the cross-linking monomer.

EXAMPLE 13a 2-hydroxy ethyl methacrylate (100 parts) is stirred with distilled water (50 parts) and tertiary butyl peroctoate (0.1 part), at a temperature of 40° C. for 20 minutes. The resultant mixture is cooled to 25° C. and t-butyl peroctoate (0.05 part) added. A cross-linking monomer such as ethylene glycol dimethacrylate (0.2 part) is added at the same time as the catalyst. The casting solution is dip-coated onto a polyethylene intra-uterine device of the type shown in U.S. Pat. 3,200,815 and cured at 70° C. for 1 hour.

EXAMPLE 13b

The process of Example 13a is repeated, substituting a mixed catalyst consisting of 0.05 part t-butyl peroctoate and 0.1 part isopropyl percarbonate. Catalyst concentration is brought to theoretical by addition of isopropyl percarbonate.

EXAMPLE 13c

The procedure of Example 13a is repeated with the modification that $BaSO_4$ (50 parts) is blended with the polymer system prior to casting and final cure.

EXAMPLE 14a

Distilled 2-hydroxy ethyl methacrylate (100 g.) is stirred with 0.1 g. of tertiary butyl peroctoate in an anaerobic atmosphere at 25–70° C. for 15–40 minutes. The resultant mixture is cooled to 25° C. and tertiary butyl peroctoate added so as to make the total concentration of tertiary butyl peroctoate in the system 0.2/100 grams of 2-hydroxy ethyl methacrylate. Ethylene glycol dimethacrylate, in the concentration of 0.2 g./100 g. of 2-hydroxy ethyl methacrylate is added at the same time as the catalyst concentration is brought up to the theoretical content. Micro silica of particle sizes 0.15–0.02 micron (commercial "Cab-O-Sil") is post added to the casting syrup to yield a prepolymer syrup of desired rheological properties for use as a denture liner base material. The casting syrup may be spread on a standard monomeric acrylic denture base material and, after being impressed, polymerized with same in a single polymerizing process in a standard molding flask under standard conditions of time, temperature and pressure. In the case of existing polymerized denture bases, the casting syrup may be spread thereon and, after being impressed, polymerized under standard denture molding conditions, the latter being disclosed in U.S. Pat. No. 2,645,012. Casting syrups for in situ polymerization to form various articles having specific desired properties such as mechanical strength, high reversible fluid absorption properties, shape retention in fluid media, and elasticity recovery after deformation are thereby formed.

EXAMPLE 14b

The process of Example 14a is followed, substituting hydroxy propyl methacrylate for the 2-hydroxy ethyl methacrylate monomer.

EXAMPLE 14c

The process of Example 14a is followed using isopropyl percarbonate as the catalyst and substituting 1,3-butylene glycol dimethacrylate as the cross-linking monomer.

EXAMPLE 14d

The process of Example 14a is followed with the exception that an integral mouth guard impression is molded from an impression by use of the said casting syrup. If desired, a reinforcing center element of rubber may be dip-coated with the casting syrup so as to provide additional rigidity.

EXAMPLE 15a 2-hydroxy ethyl methacrylate (100 g.) is mixed with tertiary butyl peroctoate in the quantity 0.15 g./100 g. methacrylate. Ethylene glycol dimethacrylate, in the concentration of 0.20 g./100 g. 2-hydroxy ethyl methacrylate is added along with 1 gm. of a foaming agent, sodium bicarbonate. The mixture is heated to 70° C. and the resulting solid, friable polymeric foam is ground into fine powder of 80 mesh. The polymeric powder so formed is mixed with a natural anise flavor solution and the resultant mixture is placed on a mechanical roller for approximately 8 hours. The polymeric powder thus absorbs the flavor. The solution is then filtered and the residue dried at room temperature.

EXAMPLE 15b

The process of the previous Example 15a is followed, substituting an oil of orchids perfume essence for the anise flavor.

EXAMPLE 16

2-hydroxy ethyl methacrylate (100 g.) is mixed with tertiary butyl peroctoate (0.20 g.). Ethylene glycol dimethacrylate (0.20 g.) is added along with 4 g. of a foaming agent, sodium bicarbonate. The mixture is heated to 70° C. and the resulting solid, friable polymeric foam is grounded into fine powder of 80 mesh. The polymeric powder formed is mixed with a sufficient amount of phenoxymethyl penicillin antibiotic dissolved in ethyl alcohol to provide for gradual release of 1,200,000 units per gram, and the resultant mixture placed on a mechanical roller until the polymeric powder has absorbed the desired concentration of antibiotic. The solution is then filtered and the residue dried in vacuo.

EXAMPLE 17

Suitably purified 2-hydroxy ethyl methacrylate is stirred with 0.15 g. isopropyl percarbonate in an anaerobic atmosphere at ambient temperature. Ethylene glycol dimethacrylate in the concentration of 0.1 g./100 g. 2-hydroxy ethyl methacrylate is added. Heparin, an anticoagulant, is added before casting. The solution is cast into a tube or mold of known vessel thickness and diameter containing a dacron tubularly shaped strengthening material so that in use, stitching of the vessel substitute to the vessel being repaired is facilitated. The strengthening material s completely encased by the casting solution. Insertion of an appropriately sized mandril into the mold yields an arterial vessel of the desired wall thickness. The shaped article is then cured 30 minutes at 40° C., removed from the mold, washed with water and subsequently stored in an aqueous solution.

EXAMPLE 18a 100 g. of 2-hydroxy ethyl methacrylate is mixed with 0.15 g. tertiary butyl peroctoate. 0.2 g. ethylene glycol dimethacrylate is added, along with 1 g. of sodium bicarbonate. The mixture is heated to 70° C. and the resulting polymer is disintegrated into pellet size particles by grinding and shearing. The pellets are mixed in a 50–50 mixture of glycerine and water for 8 hours to provide a non-migratory humectant action and dried. The resulting pellets are employed as a tobacco smoke filter in a cigarette.

EXAMPLE 18b

The process of the precedinug example is repeated with the exception that tobacco flavor is added to the glycerine-water mixture to impart a tobacco flavor to the filtered smoke to replace the flavor lost by filtration of the tars and other combustion products which normally impart the tobacco flavor upon inhalation.

In a further embodiment, an alcoholic solution of menthol was employed as a flavoring agent along with the tobacco flavor. The alcoholic solutions may be employed so as to result in amounts ranging from 1 to 90 percent by weight of the hydrophilic polymer, although 10 percent is preferred, particularly if glycerine is employed as the humectant.

EXAMPLE 18c 100 parts 2-hydroxy ethyl methacrylate is stirred with 0.05 part tertiary butyl peroctoate in a nitrogen atmosphere at a temperature of 30° C. for 30 minutes. The resultant mixture is cooled to 25° C. and additional peroctoate is added to make up a total of 0.15 part, 0.1 part ethylene glycol dimethacrylate being added at the same time. The casting solution is poured onto a plate in the form of a film and cured at 70° C. for 30 minutes to result in a chromatographic filter element capable of absorbing water soluble stain and color components such as water-soluble pigmented bodies of synthetic and natural color dyes and the like.

EXAMPLE 19

100 g. 2-hydroxy ethyl methacrylate is mixed with 0.20 g. tertiary butyl peroctoate and 0.20 g. ethylene glycol dimethacrylate is added. Water-soluble catalyst is added to the mixture before casting at 40° C. for 30 minutes to form a catalytic bed support. The dried support, when wet, with water, is adapted to release the catalyst in an aqueous solution or wet gas stream to be catalyzed.

EXAMPLE 20

100 g. 2-hydroxy ethyl methacrylate is stirred with 0.15 g. isopropyl percarbonate in an anaerobic atmosphere at ambient temperature. 0.1 g. ethylene glycol dimethacrylate is added. Before casting, a 2% aqueous solution of Merbromin is added as a general antiseptic. The resulting solution is cast onto a dacron mesh cloth in the form of a film to result in a bandage form upon curing for 30 minutes at 40° C. The dried bandage, upon being wetted by immersion in water, or on contact with the lymphatic exudate of an open wound or with mucous membrane, gradually releases the antiseptic.

EXAMPLE 21

100 g. 2-hydroxy ethyl methacrylate is stirred with 0.1 g. tertiary butyl peroctoate and 0.15 g. ethylene glycol dimethacrylate is added. Before casting at 40° C. for 30 minutes, nutrient media is added to make up 50% by weight of the polymer solution. The dry plate can be stored and thereafter immersed in water to release nutrient media for immediate staining for bacterial cultures.

EXAMPLE 22

The process of Example 12a is repeated, the casting solution being poured into molds conforming to the shape of contact lens buttons, which, after cooling and drying, can be ground by conventional means to form toric contact lenses. By compensating for the volumetric increase of about 18 percent resulting from wetting the lens after grinding, the grinding operation can be performed accurately to give the desired dimensions.

EXAMPLE 23

The process of Example 12a is repeated, the casting solution being poured into molds conforming to the shape of the desired prosthetic devices and body implants.

EXAMPLE 24

Bristles adapted for use in tooth brushes, cleansing brushes, and the like may be prepared by the process described in Example 9. If additional strength is desired for the bristles, they may be formed with an axial fiber of nylon or the like and dip-coated as described in the foregoing Example 14d, the reinforming center element being of rubber, plastic or the like.

We claim:
1. A method of preparing a hydrophilic cross-linked polymer which comprises admixing in the solvent-free state a major amount of a water soluble polymerizable hydroxyalkyl monoester of a mono-olefinic monocarboxylic acid with a minor amount of a polymerizable diester of a monolefinic monocarboxylic acid having at least two esterifiable hydroxyl groups and a major amount of a linear polyamide resin having repeating carbonamido groups in the presence of an amount of a free radical, vinyl polymerization catalyst sufficient to polymerize same.

2. A solid hydrophilic polymeric body prepared by the method of claim 1.

References Cited

UNITED STATES PATENTS

| | | | |
|---|---|---|---|
| 2,628,945 | 2/1953 | Wayne | 260—2.5 |
| 3,038,867 | 6/1962 | Czepiel. | |
| 3,066,110 | 11/1962 | Cornell | 260—2.5 |
| 3,206,418 | 9/1965 | Giberson. | |
| 3,218,305 | 11/1965 | Krieble | 260—86.1 |
| 3,274,289 | 9/1966 | Murdock et al. | 260—857 |
| 3,278,639 | 10/1966 | Matray | 260—857 |
| 3,322,731 | 5/1967 | Cook et al. | |
| 3,356,761 | 12/1967 | Fox. | |
| 3,383,448 | 5/1968 | Bader et al. | 264—171 |

SAMUEL H. BLECH, Primary Examiner

M. FOELAK, Assistant Examiner

U.S. Cl. X.R.

117—138.8, 161; 131—269; 260—2.5, 8, 27, 33.6, 33.8, 41, 86.1, 827, 829, 837, 844, 878, 879, 885; 264—1, 183, 210; 351—160, 177; 424—78